United States Patent
Lei et al.

(10) Patent No.: US 11,158,468 B2
(45) Date of Patent: Oct. 26, 2021

(54) DRAWER TYPE CIRCUIT BREAKER

(71) Applicants: ZHEJIANG CHINT ELECTRICS CO., LTD., Zhejiang (CN); SEARI ELECTRIC TECHNOLOGY CO., LTD., Shanghai (CN)

(72) Inventors: Hongjian Lei, Shanghai (CN); Zhibin Qin, Shanghai (CN); Jiangbo Ge, Shanghai (CN); Pengqi Li, Shanghai (CN)

(73) Assignees: ZHEJIANG CHINT ELECTRICS CO., LTD.; SEARI ELECTRIC TECHNOLOGY CO., LTD.

( * ) Notice: Subject to any disclaimer, the term of this patent is extended or adjusted under 35 U.S.C. 154(b) by 0 days.

(21) Appl. No.: 16/959,195

(22) PCT Filed: Jan. 2, 2019

(86) PCT No.: PCT/CN2019/070014
§ 371 (c)(1),
(2) Date: Jun. 30, 2020

(87) PCT Pub. No.: WO2019/134633
PCT Pub. Date: Jul. 11, 2019

(65) Prior Publication Data
US 2020/0402737 A1 Dec. 24, 2020

(30) Foreign Application Priority Data
Jan. 5, 2018 (CN) .......................... 201810013182.4

(51) Int. Cl.
*H01H 9/02* (2006.01)

(52) U.S. Cl.
CPC .................................. *H01H 9/02* (2013.01)

(58) Field of Classification Search
CPC . H01H 3/22; H01H 71/08; H01H 9/02; H02B 1/14
(Continued)

(56) References Cited

U.S. PATENT DOCUMENTS

| 5,343,355 A * | 8/1994 | Ishikawa | H02B 11/24 361/617 |
| 5,486,978 A * | 1/1996 | Fishovitz | H01H 9/262 200/50.21 |
| 2014/0098469 A1* | 4/2014 | Parkerson | H02B 11/24 361/617 |

FOREIGN PATENT DOCUMENTS

| CN | 102237651 A | 11/2011 |
| CN | 108173158 A | 6/2018 |

(Continued)

OTHER PUBLICATIONS

International Search Report dated Apr. 2, 2019 in corresponding PCT International Application No. PCT/CN2019/070014.
(Continued)

*Primary Examiner* — Edwin A. Leon
*Assistant Examiner* — Iman Malakooti
(74) *Attorney, Agent, or Firm* — Ostrolenk Faber LLP (57) ABSTRACT

A drawer type circuit breaker comprises a drawer base and a circuit breaker body, wherein the circuit breaker body is rocked into and out of the drawer base, so that a main circuit of the circuit breaker body and the drawer base is switched on and switched off; a safety baffle is provided between the drawer base and the circuit breaker body to block a drawer base busbar or a bridge type contact of the drawer base; and a front-rear displacement device for the safety baffle to move toward a movement direction of the drawer base is provided on the safety baffle and the drawer base. According to the drawer type circuit breaker of the present invention, the front-rear displacement device is provided on the safety (Continued)

baffle and the drawer base, the safety baffle is displaceable front and back, and the drawer base busbar may penetrate out of the safety baffle. The bridge contact can be mounted either on the drawer base or on the body, such that the mounting position of the bridge type contact is more flexible, and the connection of the main circuit is more stable and reliable.

8 Claims, 10 Drawing Sheets

(58) Field of Classification Search
USPC .......................................... 200/293; 361/617
See application file for complete search history.

(56) References Cited

FOREIGN PATENT DOCUMENTS

| | | |
|---|---|---|
| CN | 207967761 U | 10/2018 |
| EP | 0 577 111 A2 | 1/1994 |
| JP | H04-275005 A | 9/1992 |

OTHER PUBLICATIONS

Written Opinion dated Apr. 2, 2019 in corresponding PCT International Application No. PCT/CN2019/070014.

* cited by examiner

DRAWER TYPE CIRCUIT BREAKER

CROSS-REFERENCE TO RELATED APPLICATIONS

The present application is a 35 U.S.C. §§ 371 national phase conversion of PCT/CN2019/070014, filed Jan. 2, 2019, which claims priority to Chinese Patent Application No. 201810013182.4, filed Jan. 5, 2018, the contents of which are incorporated herein by reference. The PCT International Application was published in the Chinese language.

TECHNICAL FIELD

The present invention relates to the field of low-voltage electrical appliances, and more particularly to a drawer type circuit breaker.

BACKGROUND ART

At present, a safety baffle of a drawer type circuit breaker is kept unchanged in front and back positions in a drawer base, and is controlled to be opened and closed only by moving upward and downward or leftward and rightward. This limits the designs of a contact bridge structure connecting a body and the drawer base, and a mounting position.

The safety baffle of the existing drawer-type circuit breaker has poor reliability in opening and closing, and poor synchronization and stability.

SUMMARY OF THE INVENTION

An objective of the present invention aims to overcome the defects of the prior art, and provide a drawer type circuit breaker which has safe and stable performances and is simple and compact structure, and convenient to disassemble and assemble.

To fulfill said objective, the present invention adopts the following technical solutions:

A drawer type circuit breaker comprises a drawer base 1 and a circuit breaker body 2, wherein the circuit breaker body 2 is rocked into and out of the drawer base 1, so that a main circuit of the circuit breaker body 2 and the drawer base 1 is switched on and switched off; a safety baffle 3 is provided between the drawer base 1 and the circuit breaker body 2 to block a drawer base busbar or a bridge type contact of the drawer base 1; and a front-rear displacement device 4 for the safety baffle 3 to move toward a movement direction of the drawer base 1 is provided on the safety baffle 3 and the drawer base 1.

Further, the front-rear displacement device 4 comprises a shaft sleeve structure mounted on the safety baffle 3, and a guide rod 41 mounted on the drawer base 1, inserted into the middle of the shaft sleeve structure and used for guiding the safety baffle 3; a resetting spring 42 for resetting the safety baffle 3 is provided between the shaft sleeve structure and the guide rod 41; and when the circuit breaker is switched from a tested position to a connected position, the circuit breaker body 2 props against one end of the shaft sleeve structure facing the circuit breaker body 2 to push the safety baffle 3 to move backward.

Further, the shaft sleeve structure comprises a first shaft sleeve 43, and a second shaft sleeve 44 inserted into the first shaft sleeve 43 and engaged with the first shaft sleeve 43, wherein a first shaft sleeve center hole into which the second shaft sleeve 44 is inserted is formed in the middle of the first shaft sleeve 43, and a second shaft sleeve center hole 440 into which the guide rod 41 is formed in the middle of the second shaft sleeve 44; the end of the first shaft sleeve 43 extends outwardly to be provided with a first fixing edge 431 that props against one side wall of the safety baffle 3, and the end of the second shaft sleeve 44 extends outwardly to be provided with a second fixing edge 441 that props against the other side wall of the safety baffle 3.

Further, the safety baffle 3 comprises a front baffle 31 and a rear baffle 32 which are arranged in parallel, wherein the shaft sleeve structure is arranged on the rear baffle 32; the first fixing edge 431 of the first shaft sleeve 43 props against one side wall of the rear baffle 32 facing the front baffle 31, and the second fixing edge 441 of the second shaft sleeve 44 props against the other side wall of the rear baffle 32.

Further, the inner side wall of the first shaft sleeve 43 protrudes to be provided with a clamping protrusion 432 which is engaged with the second shaft sleeve 44; the end of the second shaft sleeve 44 is provided with a clamping notch 443 which is in mounting fit with the clamping protrusion 432, and the side wall of the second shaft sleeve 44 is recessed at the clamping notch 443 to be provided with a clamping groove 442 that is engaged with the clamping protrusion 432; during the mounting process, the clamping notch 443 at the end of the second shaft sleeve 44 is inserted into the clamping protrusion 432; and the second shaft sleeve 44 is rotated, such that the clamping protrusion 432 is rotated into the clamping groove 442 to snap-fit with the clamping groove 442.

Further, a spring mounting cavity 444 for mounting fit with one end of the resetting spring 42 is provided at one end of the second shaft sleeve 44; one end of the resetting spring 42 props against and limit the bottom of the spring mounting cavity 444; one end of the guide rod 41 extends into the second shaft sleeve center hole 440; the side wall of the guide rod 41 close to the other end extends outwardly to be provided with a limiting plate 412 that is in limiting fit with the other end of the resetting spring 42.

Further, the inner side wall of the drawer base 1 is provided with a bent plate 5 that limits the safety baffle 3 from moving forward.

Further, the bent plate 5 comprises a bent plate body 51 and a fixing lug 52 vertically arranged at one end of the bent plate body 51 and fixed to the inner side wall of the drawer base 1; a keep-away notch 510 is provided at one end of the bent plate body 51 facing the guide rod 41; and the fixing lug 52 is provided with a fixing hole 521 fixed with the inner side wall of the drawer base 1.

Further, the drawer type circuit breaker further comprises a connecting rod structure 6 that drives the safety baffle 3 to move to expose the drawer base busbar or the bridge type contact, wherein one end of the connecting rod structure 6 is slidably connected to one side wall of the drawer base 1 and may move horizontally and linearly along one side wall of the drawer base 1, and the other end of the connecting rod structure 6 is connected to the safety baffle 3; one end of the connecting rod structure 6 moves horizontally and linearly along one side wall of the drawer base 1 to drive the other end of the connecting rod structure 6 to actuate, thereby driving the safety baffle 3 to translate leftward and rightward; the safety baffle 3 comprises a front baffle 31 and a rear baffle 32 which are arranged in parallel, wherein the other end of the connecting rod structure 6 is fixedly connected to the front baffle 31, and one end of the connecting rod structure 6 is connected to a baffle resetting spring 7 for resetting the front baffle 31; the front baffle 31 and the rear baffle 32 are respectively provided with a through hole 301 through which the drawer base busbar or the bridge type contact is exposed; after the circuit breaker is switched from the tested position to the connected position, the through holes 301 in the front baffle 31 and the rear baffle 32 are superposed together to expose the drawer base busbar or the bridge type contact of the drawer base 1.

Further, the connecting rod structure 6 comprises a slider 61 slidably connected to one side wall of the drawer base 1, and a connecting rod 62 connected to the slider 61, wherein one end of the connecting rod 62 is fixedly connected to the slider 61, and the other end of the connecting rod 62 is fixedly connected to the front baffle 31; one side wall of the drawer base 1 is provided with a sliding slot 101 that is in sliding fit with the slider 61.

According to the drawer type circuit breaker of the present invention, the front-rear displacement device is provided on the safety baffle and the drawer base, the safety baffle is displaceable front and back, and the drawer base busbar may penetrate out of the safety baffle. The bridge type contact can be mounted either on the drawer base or on the body, such that the mounting position of the bridge type contact is more flexible, and the connection of the main circuit is more stable and reliable. The two shaft sleeves adopt a buckle structure, without the need for bolts, such that the assembly is simple, and the mounting performance is improved. In addition, the first fixing edge and the second fixing edge are used to prop against and limit the rear baffle, such that the mounting structure is stable and reliable. The first shaft sleeve and the second shaft sleeve are matched by the clamping protrusion, the clamping notch and the clamping groove, such that the mounting is convenient and fast, and the structure is stable and reliable. The first shaft sleeve and the second shaft sleeve may also be in an interference fit or mounted in other methods. The resetting spring is sleeved on the guide rod, and both ends of the resetting spring are limited and fixed, such that the structure is stable and reliable. The bent plate limits the distance that the safety baffle moves forward, and is fixed with screws through the fixing hole in the fixing lug, such that the mounting is convenient, and the structure is stable and reliable. The keep-away notch is used for keeping the guide rod away to provide a mounting space for the guide rod.

DETAILED DESCRIPTION

The specific implementation of a drawer type circuit breaker of the present invention will be further described below with reference to the embodiments given in the accompanying drawings 1 to 20. The drawer type circuit breaker of the present invention is not limited to the description of the following embodiments.

Figure 1:
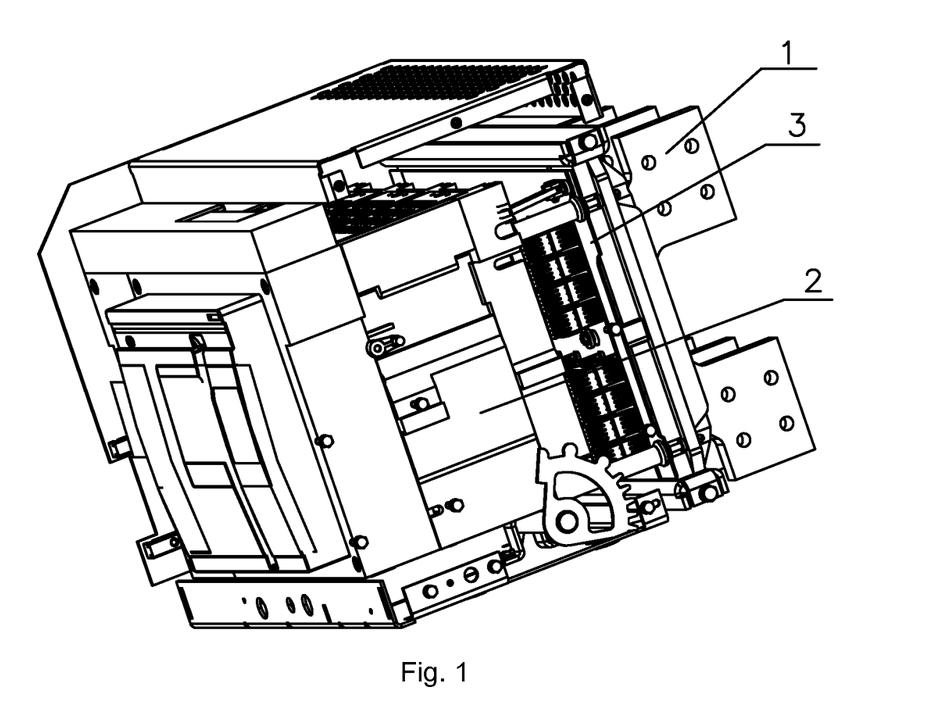
FIG. 1 is an overall structural diagram of a drawer type circuit breaker of the present invention.
Figure 2:
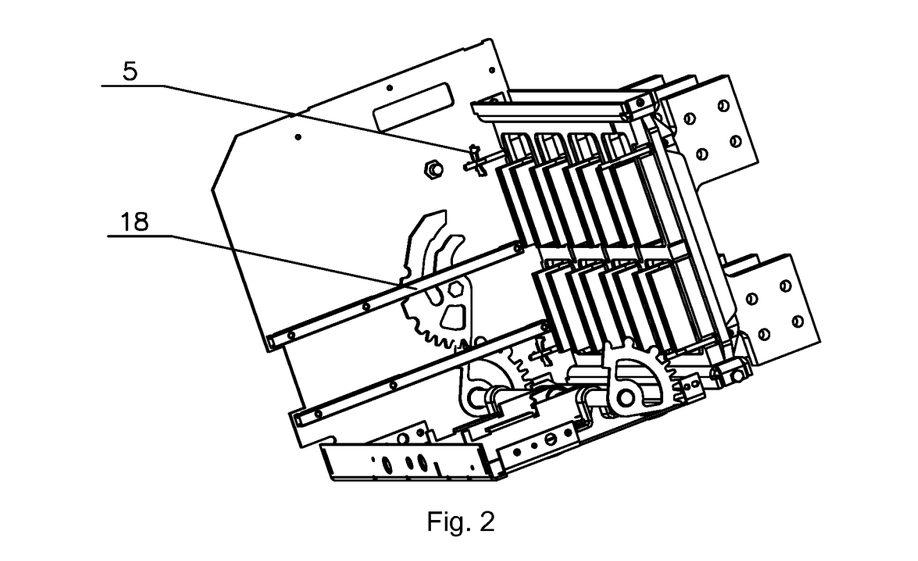
FIG. 2 is a structural diagram of a drawer base of the present invention.
Figure 3:
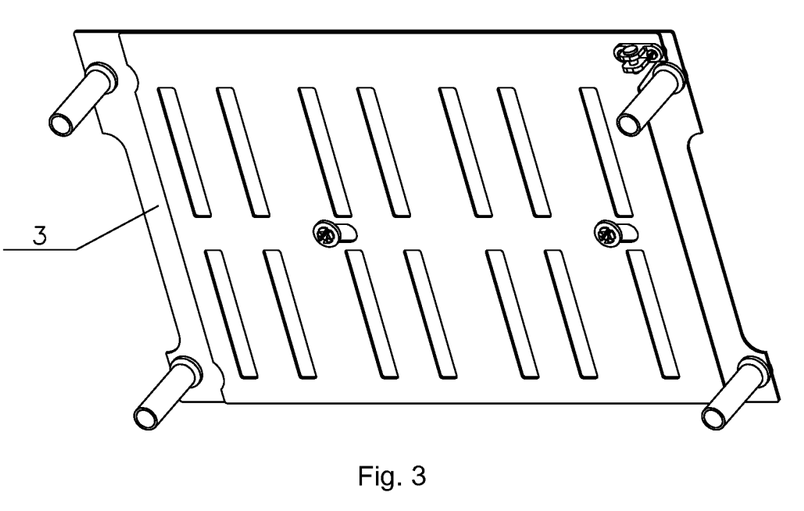
FIG. 3 is a diagram showing a closed state of a safety baffle of the present invention.

As shown in FIGS. 1-2, a drawer type circuit breaker of the present invention comprises a drawer base 1 and a circuit breaker body 2, wherein the circuit breaker body 2 is rocked into and out of the drawer base 1, so that a main circuit of the circuit breaker body 2 and the drawer base 1 is switched on and switched off; a safety baffle 3 is provided between the drawer base 1 and the circuit breaker body 2 to block a drawer base busbar or a bridge type contact of the drawer base 1. The connection position between the drawer base 1 and the circuit breaker body 2 is divided into three states, i.e., a connected state, a tested state, and a separated state. A guide rail 18 for the circuit breaker body 2 to be rocked in and out is respectively provided on two side walls of the drawer base 1.

Figure 11:
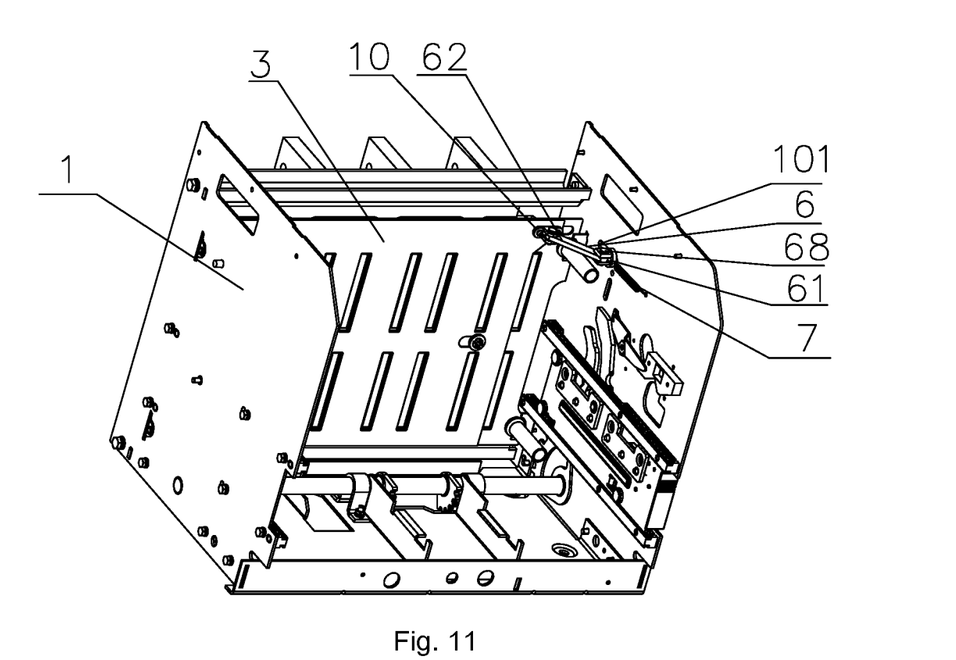
FIG. 11 is a structural diagram of a drawer base and an internal connecting rod structure of the present invention when the safety baffle is opened.
Figure 12:
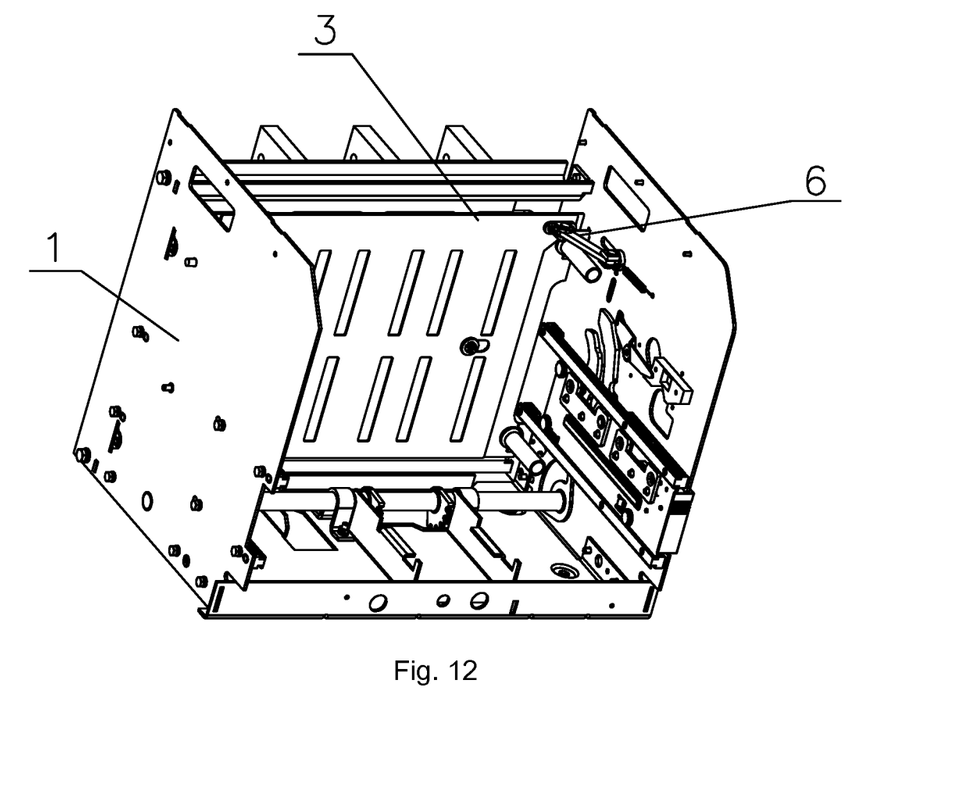
FIG. 12 is a structural diagram of the drawer base and the internal connecting rod structure of the present invention when the safety baffle is closed.

As shown in FIGS. 11-12, it should be noted that the left-right movement of the safety baffle 3 of the drawer type circuit breaker of the present invention means that the safety baffle 3 moves to both sides of the drawer base 1. The up-down movement of the safety baffle 3 means that the safety baffle 3 moves toward upper and lower ends of the drawer base 1. The front-back movement of the safety baffle 3 refers to a movement direction of the circuit breaker body 2. According to this embodiment of the present invention, the bridge type contact is mounted on the circuit breaker body 2. In fact, the bridge type contact can also be mounted on the drawer base 1. The safety baffle 3 is used to block or expose the bridge type contact.

As shown in FIGS. 3-10, a front-rear displacement device 4 for the safety baffle 3 to move toward the movement direction of the drawer base 1 is provided on the safety baffle 3 and the drawer base 1. According to the drawer type circuit breaker of the present invention, the front-rear displacement device is provided on the safety baffle and the drawer base, the safety baffle is displaceable front and back, and the drawer base busbar may penetrate out of the safety baffle. The bridge type contact can be mounted either on the drawer base or on the body, such that the mounting position of the bridge type contact is more flexible, and the connection of the main circuit is more stable and reliable. However, the original safety baffle can only be opened and closed. The front and back positions of the safety baffle and the drawer base busbar remain unchanged. That is, the drawer base busbar cannot pass through the safety baffle in the front-rear direction, and therefore, it is difficult to realize the structure in which the bridge type contact is mounted on the body.

As shown in FIGS. 3-10, the front-rear displacement device 4 comprises a shaft sleeve structure mounted on the safety baffle 3 and a guide rod 41 mounted on the drawer base 1, inserted into the middle of the shaft sleeve structure and used for guiding the safety baffle 3; a resetting spring 42 for resetting the safety baffle 3 is provided between the shaft sleeve structure and the guide rod 41; and when the circuit breaker is switched from a tested position to a connected position, the circuit breaker body 2 props against one end of the shaft sleeve structure facing the circuit breaker body 2 to push the safety baffle 3 to move backward. According to the shaft sleeve structure of the present invention in which the front-back displacement device is mounted on the baffles, the guide rod 41 and the resetting spring on the drawer base are mounted coaxially, thereby providing a compact front-back displacement device. It is apparent that the guide rod 41 may also be provided on the safety baffle 3, and the shaft sleeve structure may also be provided on the drawer base 1.

As shown in FIGS. 3-6, the safety baffle 3 comprises a front baffle 31 and a rear baffle 32 which are arranged in parallel. The front baffle 31 and the rear baffle 32 are both plate-shaped structures. The shaft sleeve structure is provided on the rear baffle 32. The shaft sleeve structure comprises a first shaft sleeve 43, and a second shaft sleeve 44 inserted into the first shaft sleeve 43 and engaged with the first shaft sleeve 43, wherein a first shaft sleeve center hole 430 into which the second shaft sleeve 44 is inserted is formed in the middle of the first shaft sleeve 43, and a second shaft sleeve center hole 440 into which the guide rod 41 is inserted is formed in the middle of the second shaft sleeve 44; the end of the first shaft sleeve 43 extends outwardly to be provided with a first fixing edge 431 that props against one side wall of the safety baffle 3, and the end of the second shaft sleeve 44 extends outwardly to be provided with a second fixing edge 441 that props against the other side wall of the safety baffle 3. The first fixing edge 431 of the first shaft sleeve 43 props against one side wall of the rear baffle 32 facing the front baffle 31, and the second fixing edge 441 of the second shaft sleeve 44 props against the other side wall of the rear baffle 32. The two shaft sleeves adopt a buckle structure, without the need for bolts, such that the assembly is simple, and the insulation performance is improved. In addition, the first fixing edge 431 and the second fixing edge 441 are used to push against and limit the rear baffle 32, such that the mounting structure is stable and reliable. Obviously, the front baffle and the rear baffle can also achieve the same function when they are interchanged, and the shaft sleeve structure can also be provided on the front baffle 31.

Specifically, the first shaft sleeve 43 and the second shaft sleeve 44 which are cooperatively mounted are respectively provided on four corners of the rear baffle 32. The first shaft sleeve 43 and the second shaft sleeve 44 may also be provided diagonally on the rear baffle 32 respectively, or on the upper end of the rear baffle 32, or on the lower end of the rear baffle 32. In particular, the safety baffle can also be a plate.

As shown in FIGS. 6-10, the first shaft sleeve 43 and the second shaft sleeve 44 are snap-fitted. The inner side wall of the first shaft sleeve 43 protrudes to be provided with a clamping protrusion 432 which is engaged with the second shaft sleeve 44; the end of the second shaft sleeve 44 is provided with a clamping notch 443 which is in mounting fit with the clamping protrusion 432, and the side wall of the second shaft sleeve 44 is recessed at the clamping notch 443 to be provided with a clamping groove 442 that is engaged with the clamping protrusion 432; during the mounting process, the clamping notch 443 at the end of the second shaft sleeve 44 is inserted into the clamping protrusion 432; and the second shaft sleeve 44 is rotated, such that the clamping protrusion 432 is rotated into the clamping groove 442 to snap-fit with the clamping groove 442. The first shaft sleeve and the second shaft sleeve are matched by the clamping protrusion, the clamping notch and the clamping groove, such that the mounting is convenient and fast, and the structure is stable and reliable. The first shaft sleeve 43 and the second shaft sleeve 44 may also be in an interference fit or mounted in other methods.

Figure 6:
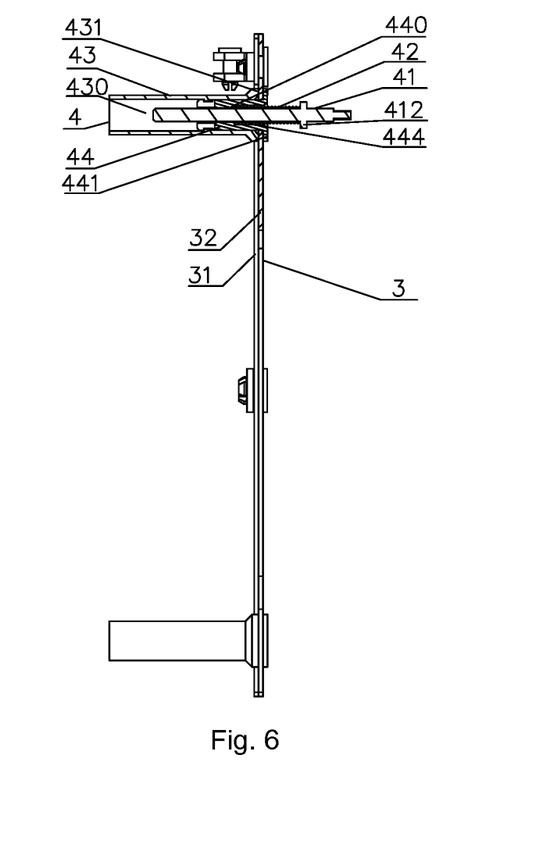
FIG. 6 is a side sectional view of the safety baffle and a front-rear displacement device of the present invention.
Figure 7:
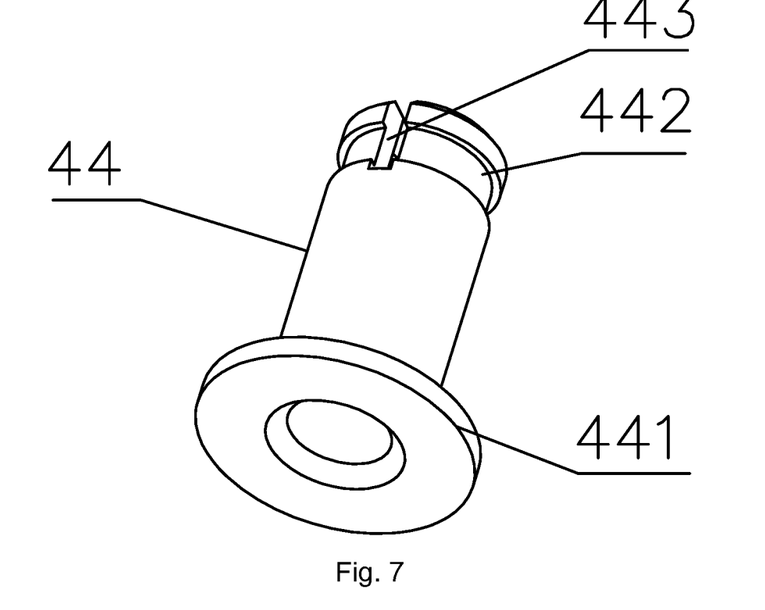
FIG. 7 is a stereogram of a second shaft sleeve of the present invention.
Figure 8:
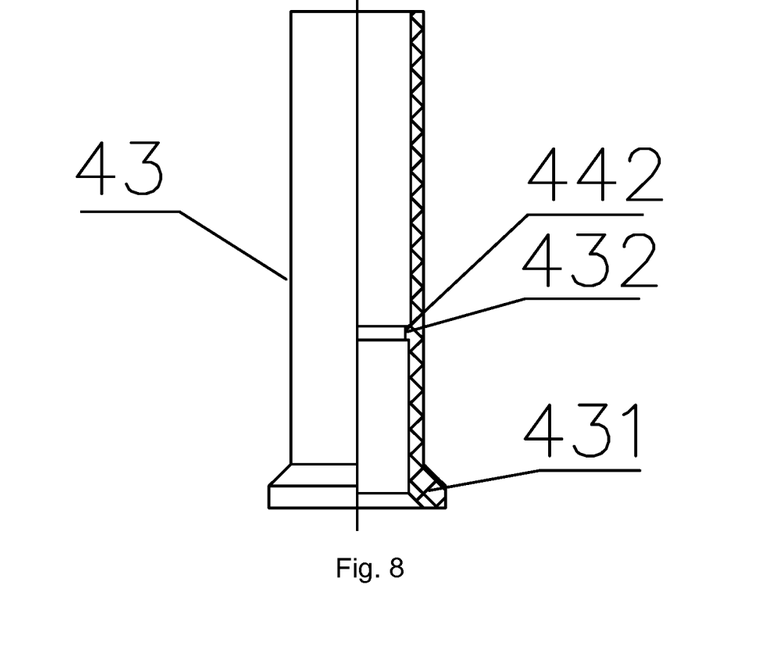
FIG. 8 is a half sectional view of a first shaft sleeve of the present invention.
Figure 9:
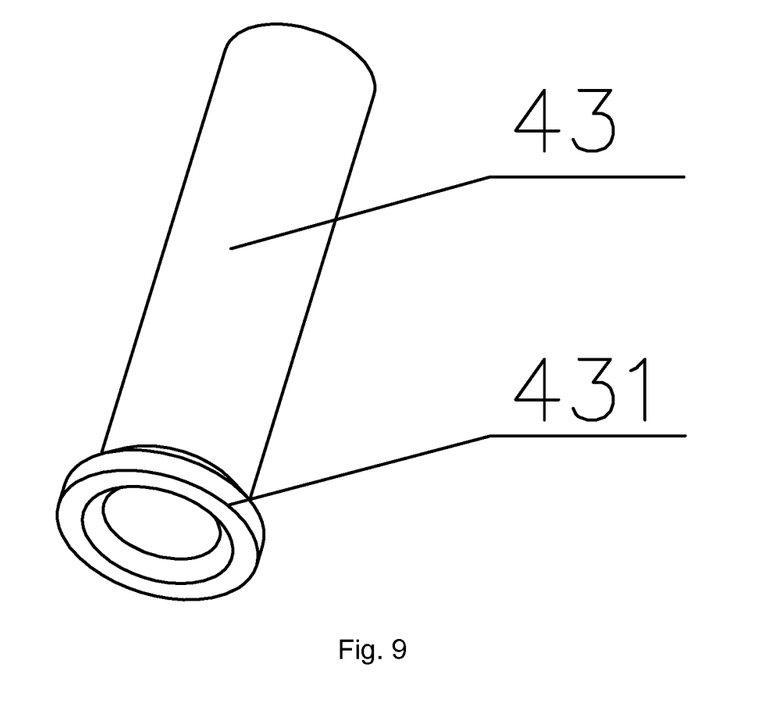
FIG. 9 is a stereogram of the first shaft sleeve of the present invention.

As shown in FIG. 6, a spring mounting cavity 444 for mounting fit with one end of the resetting spring 42 is provided at one end of the second shaft sleeve 44; one end of the resetting spring 42 props against and limits the bottom of the spring mounting cavity 444; one end of the guide rod 41 extends into the second shaft sleeve center hole 440; the side wall of the guide rod 41 close to the other end extends outwardly to be provided with a limiting plate 412 that is in limiting fit with the other end of the resetting spring 42. The resetting spring 42 is sleeved on the guide rod 41, and both ends of the resetting spring 42 are limited and fixed, such that the structure is stable and reliable. The resetting spring 42 can also adopt other fixing structures.

Figure 10:
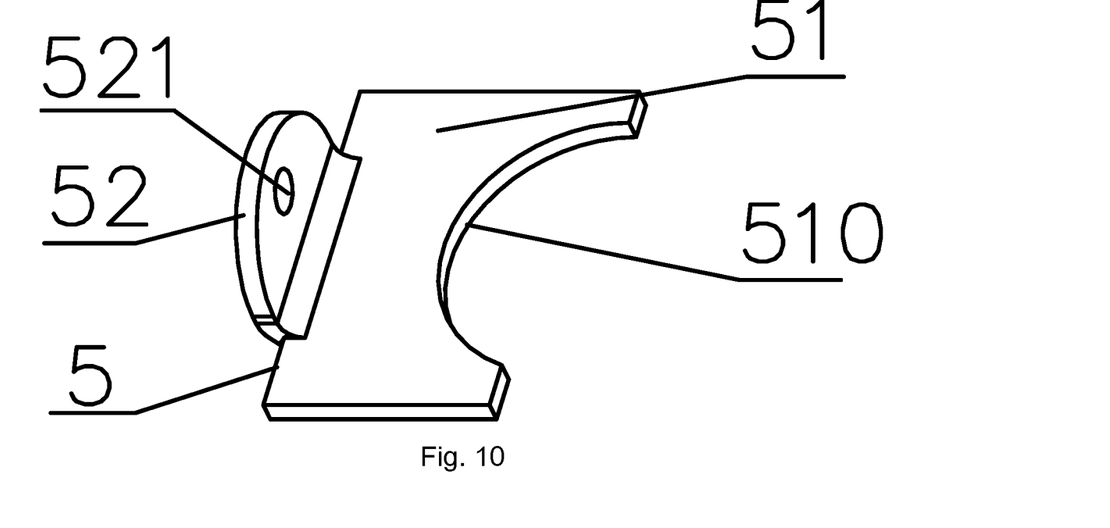
FIG. 10 is a stereogram of a bent plate 5 of the present invention.

As shown in FIG. 2 and FIG. 10, the inner side wall of the drawer base 1 is provided with a bent plate 5 that limits the safety baffle 3 from moving forward. The bent plate 5 limits the distance that the safety baffle 3 moves forward. The bent plate 5 comprises a bent plate body 51 and a fixing lug 52 vertically arranged at one end of the bent plate body 51 and fixed to the inner side wall of the drawer base 1; a keep-away notch 510 is provided at one end of the bent plate body 51 facing the guide rod 41; and the fixing lug 52 is provided with a fixing hole 521 fixed with the inner side wall of the drawer base 1. The bent plate 5 is fixed with screws through the fixing hole 521 in the fixing lug 52, such that the mounting is convenient, and the structure is stable and reliable. The keep-away notch 510 is used for keeping the guide rod 41 away to provide a mounting space for the guide rod 41.

During operation, when the drawer-type circuit breaker is switched from a tested position to a connected position, the circuit breaker body 2 moves backward. The circuit breaker body 2 props against the end of the first shaft sleeve 43 and pushes the safety baffle 3 to move backward. The resetting spring 42 is compressed and stored with energy until the drawer circuit breaker is in the connected position. When the drawer type circuit breaker is switched from the connected position to the tested position, the resetting spring 42 releases the energy to push the safety baffle 3 to move forward till it stops moving forward under the limit of the bent plate 5, and the drawer type circuit breaker is in the tested position.

As shown in FIGS. 11-20, the drawer type circuit breaker of the present invention further comprises a connecting rod structure 6 that drives the safety baffle 3 to move to expose the drawer base busbar or the bridge type contact, wherein one end of the connecting rod structure 6 is slidably connected to one side wall of the drawer base 1 and move linearly along one side wall of the drawer base 1, and the other end of the connecting rod structure 6 is connected to the safety baffle 3; one end of the connecting rod structure 6 actuates to drive the other end of the connecting rod structure 6 to actuate, thereby driving the safety baffle 3 to translate to expose or block the drawer base busbar or the bridge type contact of the drawer base 1. The connecting rod structure 6 that drives the safety baffle to move to expose the drawer base busbar or the bridge type contact is provided in the present invention, wherein one end of the connecting rod structure is connected to one side wall of the drawer base and moves linearly along the side wall of the drawer base, and the other end of the connecting rod structure actuates to drive the safety baffle to translate to expose or block the drawer base busbar or the bridge type contact of the drawer base, such that the mounting structure of the connecting rod structure is stable and reliable, and the synchronization and stability of the actions of the connecting rod structure and the safety baffle are good.

Figure 13:
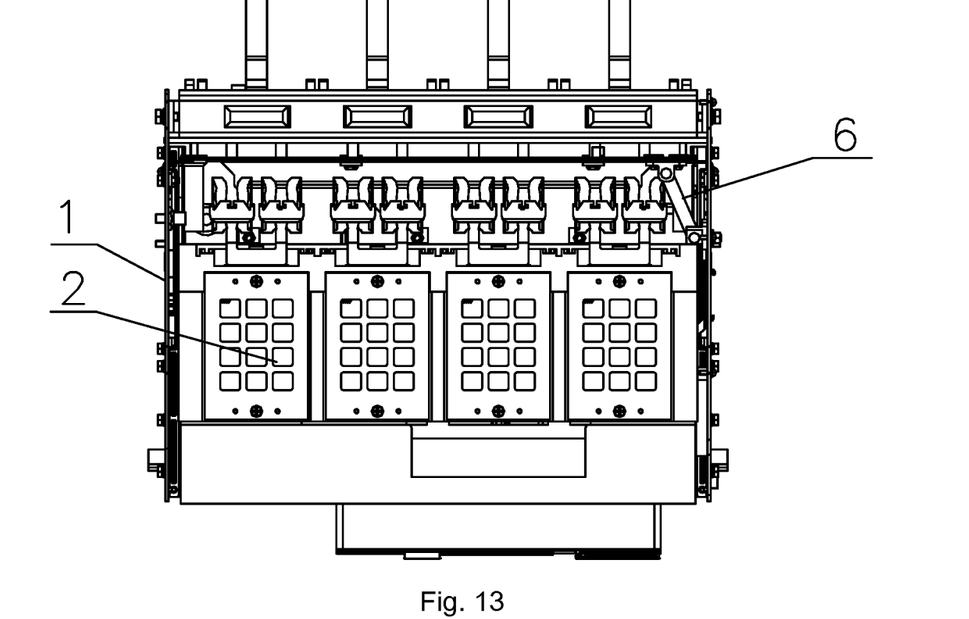
FIG. 13 is a top view of the drawer type circuit breaker of the present invention.

As shown in FIGS. 11-13, one end of the connecting rod structure 6 moves horizontally and linearly along one side wall of the drawer base 1 to drive the other end of the connecting rod structure 6 to drive the safety baffle 3 to move leftward and rightward. The other end of the connecting rod structure 6 is fixedly connected to the front baffle 31, and one end of the connecting rod structure 6 is connected to a baffle resetting spring 7 for resetting the front baffle 31. In particular, the connecting rod structure 6 may actuate vertically and linearly to drive the safety baffle 3 to move leftward and rightward or upward and downward, or may actuate horizontally and linearly to drive the safety baffle 3 to move upward and downward.

As shown in FIG. 11, the connecting rod structure 6 comprises a slider 61 slidably connected to one side wall of the drawer base 1, and a connecting rod 62 connected to the slider 61, wherein one end of the connecting rod 62 is fixedly connected to the slider 61, and the other end of the connecting rod 62 is fixedly connected to the front baffle 31; one side wall of the drawer base 1 is provided with a sliding slot 101 that is in sliding fit with the slider 61. The connecting rod structure 6 comprises a slider 61 and a connecting rod 62, and the movement of the slider 61 is stable and reliable. Obviously, the connecting rod structure 6 can also be provided on the other side wall of the drawer base 1.

Figure 17:
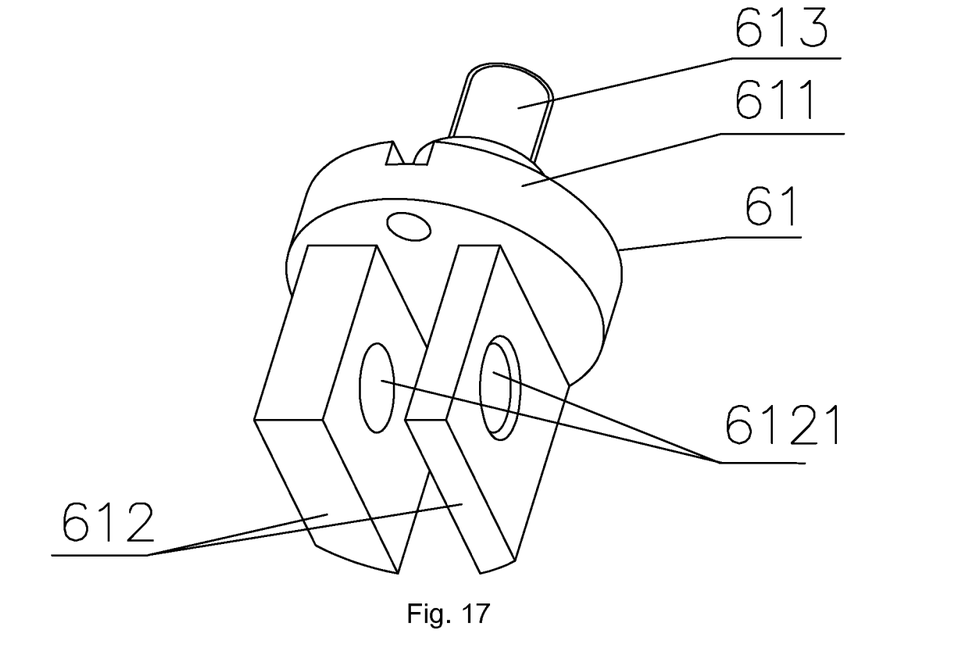
FIG. 17 is a structural diagram of a slider of the present invention.
Figure 18:
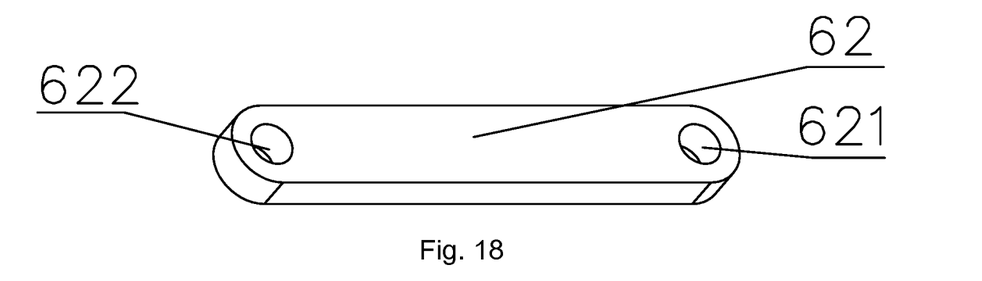
FIG. 18 is a structural diagram of a connecting rod of the present invention.

As shown in FIG. 17, the slider 61 comprises a circular slider plate 611. Two parallel first connecting rod connecting plates 612 which are provided in parallel with each other are vertically provided on one side of the slider plate 611 that is connected to the connecting rod 62. Each first connecting rod connecting plate 612 is provided with a connecting rod mounting hole 6121 connected to one end of the connecting rod 62. The connecting rod 62 is a long plate-shaped structure, wherein one end of the connecting rod 62 is provided with a first connecting rod through hole 621 which is in mounting fit with the connecting rod mounting hole 6121. One end of the connecting rod 62 extends between the two first connecting rod connecting plates 612, and hinged with the slider 61 through a first dowel 68 after passing through the connecting rod mounting hole 6121 and the first connecting rod through hole 621. A fixed end is provided on the other side of the slider plate 611. The slider 61 is simple in structure, easy to process, and is mounted with the connecting rod stably and reliably.

Figure 19:
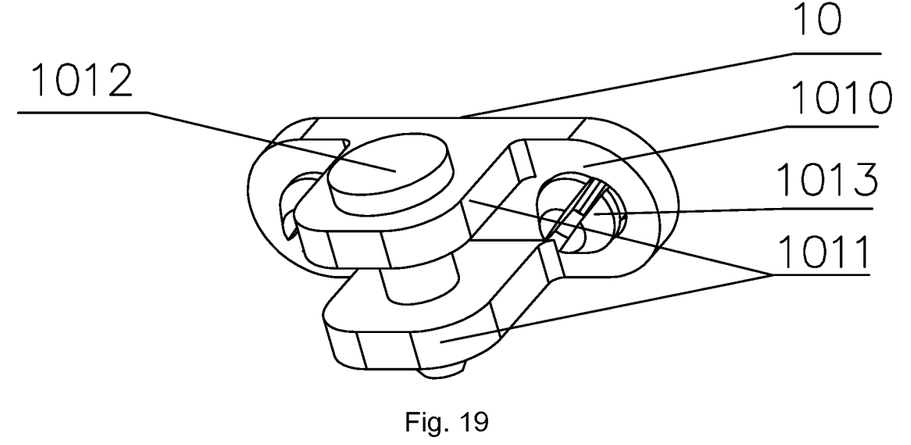
FIG. 19 is a structural diagram of a connecting member of the present invention.

As shown in FIGS. 11 and 19, the other end of the connecting rod 62 is fixedly connected to the front baffle 31 through a connecting member 10. The connecting member comprises a connecting member body 1010. Two second connecting rod connecting plates 1011 which are parallel to each other are vertically provided on the connecting member body 1010 towards one side connected with the other end of the connecting rod 62. The connecting rod 62 is a long plate-like structure. The other end of the connecting rod 62 is provided with a second connecting rod through hole 622 which cooperates with the second connecting rod connecting plates 1011. The other end of the connecting rod 62 extends between the two second connecting rod connecting plates 1011 and is fixedly connected to the connecting member 10 through a second dowel 1012. Both ends of the connecting member 10 are fixed to the front baffle 31 via a third dowel 1013. The other end of the connecting rod 62 is fixed to the front baffle 31 through the connecting member 10, and the mounting structure at the other end of the connecting rod is stable and reliable. The structure of the connecting member is simple, which is convenient for processing and assembling.

Figure 4:
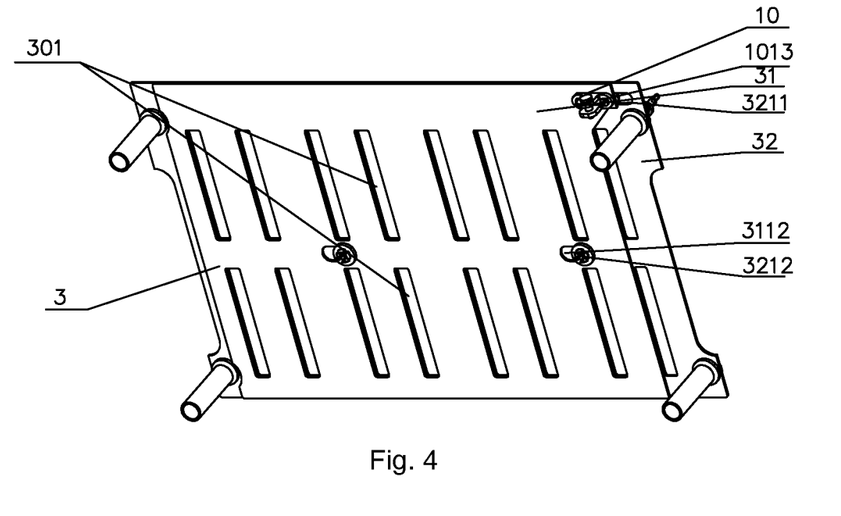
FIG. 4 is a diagram showing an opened state of the safety baffle of the present invention.
Figure 5:
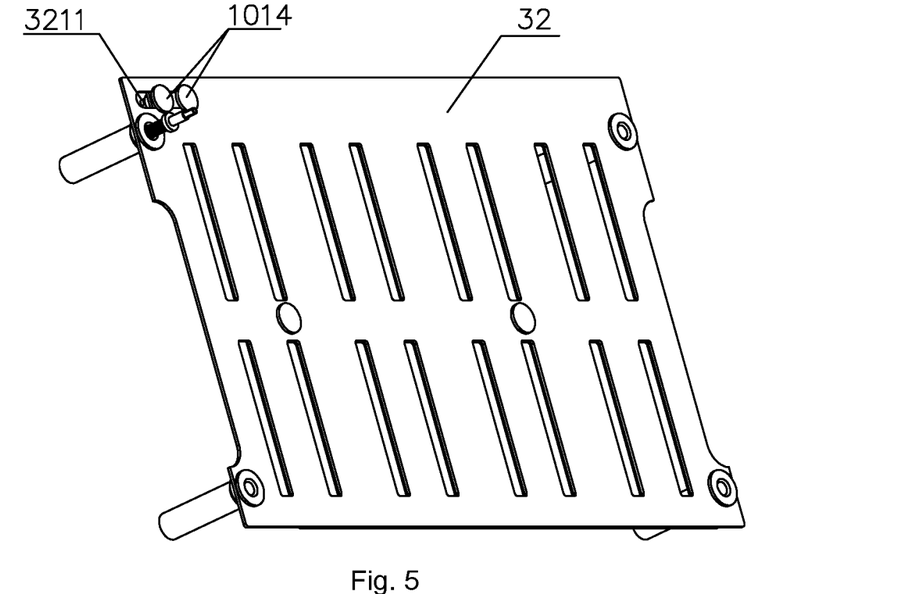
FIG. 5 is a structural diagram showing the back of the safety baffle of the present invention.

As shown in FIGS. 4-5, the rear baffle 32 is provided with a first guide groove 3211 in sliding fit with the third dowel 1013, a buckle cap 1014 is provided at the end of the third dowel 1013 facing the rear baffle 32, and the buckle cap 1014 is buckled on the rear side wall of the rear baffle 32. The third dowel 1013 plays a role of fixing the connecting member 10 on the one hand, plays a role of guiding the front baffle in cooperation with the first guide groove 3211 on the other hand, and then maintains a distance between the front baffle 31 and the rear baffle 32, thereby preventing the front and rear baffles from separating due to the deformation of the baffles during the movement, achieving a plurality of functions, saving raw materials and reducing the cost. In addition, the rear baffle 32 is provided with a second guide shaft 3212 for guiding the front baffle 31 to translate and maintain the distance between the front baffle 31 and the rear baffle 32. The front baffle 31 is provided with a second guide groove 3112 in sliding fit with the second guide shaft 3212. In this embodiment, the second guide groove 3112 is provided on each of two sides in the middle of the front baffle 31, and the second guide shaft 3212 is respectively provided on the corresponding positions of the rear baffle 32. Obviously, the positions and number of the second guide shafts 3212 and the second guide grooves 3112 can be adjusted according to actual conditions. In addition to the guiding function, the second guide shafts 3212 also play a role in limiting the distance between the front and rear baffles, thereby preventing the front and rear baffles from separating during the movement process.

Figure 14:
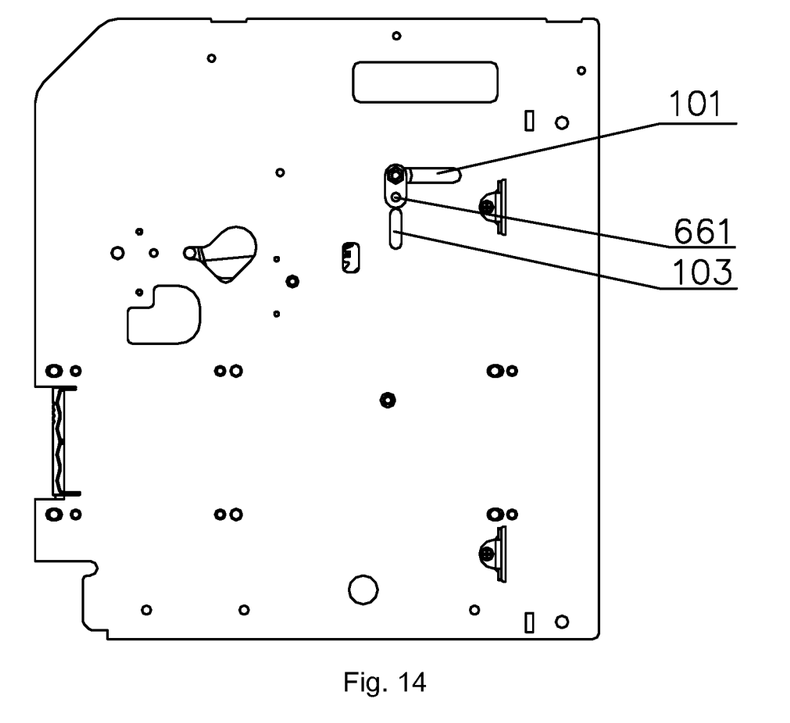
FIG. 14 is a side view of the drawer base of the present invention.
Figure 15:
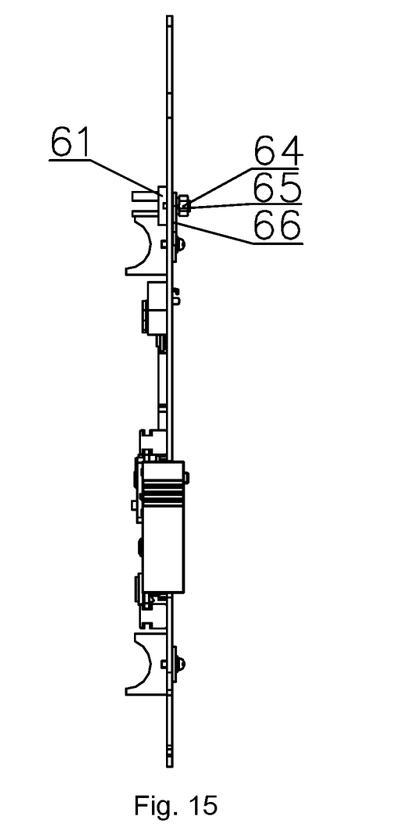
FIG. 15 is a side view of one side wall of the drawer base of the present invention.
Figure 20:
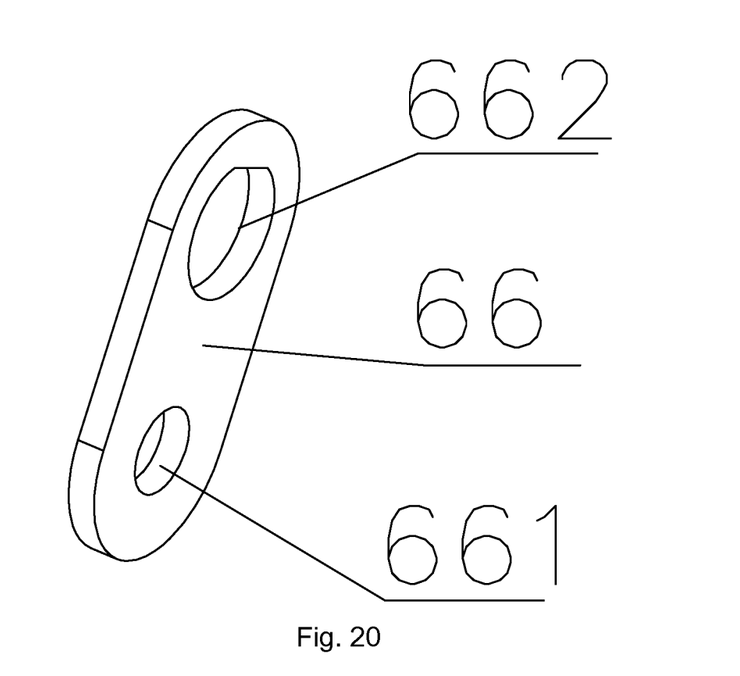
FIG. 20 is a structural diagram of a flat gasket of the present invention.

As shown in FIGS. 14, 15, and 20, the slider 61 is mounted on one side wall of the drawer base 1 through a hexagon nut 64. One end of the slider 61 is connected to one end of the connecting rod 62, the other end of the slider 61 passes through a sliding slot 101 and is fixed to the hexagon nut 64 on the other side of the side wall of the drawer base 1, and a spring gasket 65 and a flat gasket 66 are sequentially provided below the hexagon nut 64. The other end of the slider 61 is fixed to one side wall of the drawer base through the hexagon nut 64, the flat gasket 66 and the spring gasket 65. The spring gasket 65 is used to prevent the nut from loosening. The flat gasket 66 increases the mounting stability of the slider 61, and the mounting structure at the other end of the slider 61 is stable and reliable. The flat gasket 66 is provided with a through hole 662 through which the other end of the slider 61 passes.

Figure 16:
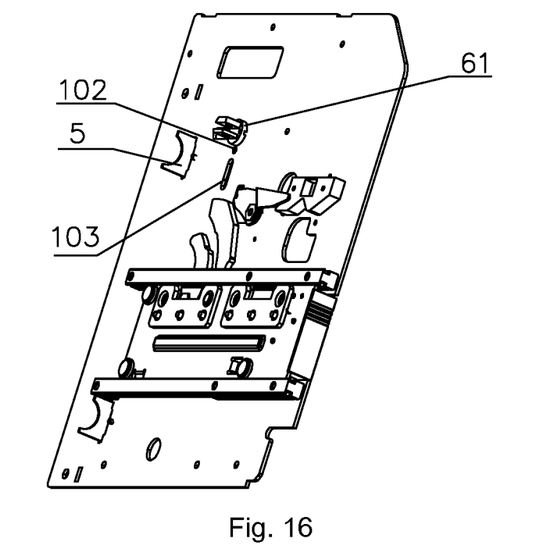
FIG. 16 is a stereogram of one side wall of the drawer base of the present invention.

As shown in FIGS. 14 and 16, the drawer type circuit breaker further comprises a padlock structure that locks the circuit breaker body 2 in the tested position. The padlock structure comprises a first padlock hole 661 provided in the flat gasket 66 and a second padlock hole 102 provided in one side wall of the drawer base 1. A padlock window 103 is provided below the second padlock hole 102. When the circuit breaker body 2 is in the tested position or the separated position, the first padlock hole 661 and the second padlock hole 102 coincide with each other and penetrated by a lock beam of the padlock, and a lock body of the padlock is received in the padlock window 103. The padlock structure keeps the safety baffle closed, prevents the circuit breaker from entering the connected position from the separated position or tested position, and ensures the safety in use of electricity.

During operation, when the drawer type circuit breaker is switched from the tested position to the connected position, the circuit breaker body 2 moves backward. The circuit breaker body 2 pushes the connecting rod 62, the slider 61 at one end of the connecting rod 62 moves backward, and the other end of the connecting rod 62 drives the front baffle 31 to move leftward. The safety baffle 3 is opened, the baffle resetting spring 7 is stretched and stored with energy, and the circuit breaker body 2 continues to move forward until the drawer type circuit breaker is in the connected position. When the drawer-type circuit breaker is switched from the connected position to the tested position, the resetting spring 7 releases the energy, the slider 61 drives the front baffle 31 to move rightward, and the safety baffle 3 is closed until the drawer type circuit breaker is in the tested position.

The above content is a further detailed description of the present invention in conjunction with specific preferred embodiments, and it cannot be affirmed that the specific implementation of the present invention is limited to these descriptions. For a person of ordinary skill in the technical field to which the present invention belongs, several simple deductions or replacements can be made without deviating from the concept of the present invention, which should be regarded as falling within the protection scope of the present invention.

The invention claimed is:

1. A drawer type circuit breaker, comprising:
   a drawer base and a circuit breaker body, wherein the circuit breaker body is rocked into and out of the drawer base, so that a main circuit of the circuit breaker body and the drawer base is switched on and switched off;
   a safety baffle is provided between the drawer base and the circuit breaker body to block a drawer base busbar or a bridge type contact of the drawer base; and
   a front-rear displacement device for the safety baffle to move toward a movement direction of the drawer base is provided on the safety baffle and the drawer base, wherein:
   the front-rear displacement device comprises a shaft sleeve structure mounted on the safety baffle, and a guide rod mounted on the drawer base, inserted into the middle of the shaft sleeve structure and used for guiding the safety baffle;
   a resetting spring for resetting the safety baffle is provided between the shaft sleeve structure and the guide rod;
   when the circuit breaker is switched from a tested position to a connected position, the circuit breaker body props against one end of the shaft sleeve structure facing the circuit breaker body to push the safety baffle to move backward;
   the shaft sleeve structure comprises a first shaft sleeve, and a second shaft sleeve inserted into the first shaft sleeve and engaged with the first shaft sleeve, wherein a first shaft sleeve center hole into which the second shaft sleeve is inserted is formed in the middle of the first shaft sleeve, and a second shaft sleeve center hole into which the guide rod is formed in the middle of the second shaft sleeve; and
   the end of the first shaft sleeve extends outwardly to be provided with a first fixing edge that props against one side wall of the safety baffle, and the end of the second shaft sleeve extends outwardly to be provided with a second fixing edge that props against the other side wall of the safety baffle.

2. The drawer type circuit breaker according to claim 1, wherein:
   the safety baffle comprises a front baffle and a rear baffle which are arranged in parallel, wherein the shaft sleeve structure is arranged on the rear baffle;
   the first fixing edge of the first shaft sleeve props against one side wall of the rear baffle facing the front baffle; and
   the second fixing edge of the second shaft sleeve props against the other side wall of the rear baffle.

3. The drawer type circuit breaker according to claim 1, wherein:
   the inner side wall of the first shaft sleeve protrudes to be provided with a clamping protrusion which is engaged with the second shaft sleeve;
   the end of the second shaft sleeve is provided with a clamping notch which is in mounting fit with the clamping protrusion, and the side wall of the second shaft sleeve is recessed at the clamping notch to be provided with a clamping groove that is engaged with the clamping protrusion;
   during the mounting process, the clamping notch at the end of the second shaft sleeve is inserted into the clamping protrusion; and
   the second shaft sleeve is rotated, such that the clamping protrusion is rotated into the clamping groove to snap-fit with the clamping groove.

4. The drawer type circuit breaker according to claim 1, wherein:
   a spring mounting cavity for mounting fit with one end of the resetting spring is provided at one end of the second shaft sleeve;
   one end of the resetting spring props against and limits the bottom of the spring mounting cavity;
   one end of the guide rod extends into the second shaft sleeve center hole; and
   the side wall of the guide rod close to the other end extends outwardly to be provided with a limiting plate that is in limiting fit with the other end of the resetting spring.

5. The drawer type circuit breaker according to claim 1, wherein the inner side wall of the drawer base is provided with a bent plate that limits the safety baffle from moving forwards.

6. The drawer type circuit breaker according to claim 5, wherein:
   the bent plate comprises a bent plate body, and a fixing lug vertically arranged at one end of the bent plate body and fixed to the inner side wall of the drawer base;
   a keep-away notch is provided at one end of the bent plate body facing the guide rod; and
   the fixing lug is provided with a fixing hole fixed with the inner side wall of the drawer base.

7. The drawer type circuit breaker according to claim 1, further comprising a connecting rod structure that drives the safety baffle to move to expose the drawer base busbar or the bridge type contact, wherein:
- one end of the connecting rod structure is slidably connected to one side wall of the drawer base and moves horizontally and linearly along one side wall of the drawer base, and the other end of the connecting rod structure is connected to the safety baffle;
- one end of the connecting rod structure moves horizontally and linearly along one side wall of the drawer base to drive the other end of the connecting rod structure to actuate, thereby driving the safety baffle to translate leftward and rightward;
- the safety baffle comprises a front baffle and a rear baffle which are arranged in parallel, wherein the other end of the connecting rod structure is fixedly connected to the front baffle, and one end of the connecting rod structure is connected to a baffle resetting spring for resetting the front baffle;
- the front baffle and the rear baffle are respectively provided with a through hole through which the drawer base busbar or the bridge type contact is exposed;
- when the drawer type circuit breaker is switched from the tested position to the connected position, the circuit breaker body moves backward, the circuit breaker body pushes the connecting rod, and the other end of the connecting rod drives the front baffle to move, the safety baffle is opened; and
- after the circuit breaker is switched from the tested position to the connected position, the through holes in the front baffle and the rear baffle are superposed together to expose the drawer base busbar or the bridge type contact of the drawer base.

8. The drawer type circuit breaker according to claim 7, wherein the connecting rod structure (comprises a slider slidably connected to one side wall of the drawer base, and a connecting rod connected to the slider, wherein:
- one end of the connecting rod is fixedly connected to the slider, and the other end of the connecting rod is fixedly connected to the front baffle; and
- one side wall of the drawer base is provided with a sliding slot that is in sliding fit with the slider.

* * * * *